(12) United States Patent
Cao

(10) Patent No.: US 6,735,215 B1
(45) Date of Patent: May 11, 2004

(54) APPARATUS AND METHOD FOR AUTOMATIC PORT IDENTITY DISCOVERY IN HETEROGENOUS SYSTEMS

(75) Inventor: Yang Cao, Bradford, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/524,419

(22) Filed: Mar. 11, 2000

(51) Int. Cl.[7] .................................................. H04J 3/16
(52) U.S. Cl. ........................................ 370/437; 370/356
(58) Field of Search ................................. 370/352–356, 370/358, 373, 377, 384, 385, 410, 426, 431, 228, 395.3, 437

(56) References Cited

U.S. PATENT DOCUMENTS 5,889,776 A * 3/1999 Liang .......................... 370/389
6,512,740 B1 * 1/2003 Baniewicz et al. ......... 370/216

FOREIGN PATENT DOCUMENTS

EP 0 230 549 B1 1/1993

* cited by examiner

Primary Examiner—Wellington Chin
Assistant Examiner—Brenda Pham

(57) ABSTRACT

A network element for use in a heterogeneous telecommunications system employs "out of band" signalling to automatically discover the identity of the two ports connecting two network elements through a specific link. Either of the connected network elements may be a circuit switching network element or a packet switching network element. One network element initiates the port discovery process and transmits a SONET/SDH overhead signal to the network element attached at the other end of the link. The other network element monitors the status of its ports and, when it detects a change in state at one of the ports, resulting from the first network element's transmissions, the receiving, or passive, network element recognizes the port as the port which forms a part of the link of interest.

22 Claims, 6 Drawing Sheets

| Byte K2 Bits 6,7, 8, (Channel Status) Definition 2 |
|---|
| 111 = AIS-L |
| 110 = RDI - L |
| 101 = Not Used |
| 100 = Not Used |
| 011 = ET (Extra traffic on protection channel) |
| 010 = Bridged and switched |
| 001 = Bridged |
| 000 = Idle |

APPARATUS AND METHOD FOR AUTOMATIC PORT IDENTITY DISCOVERY IN HETEROGENOUS SYSTEMS

FIELD OF THE INVENTION

The invention relates to the determination of port identities in a telecommunications system and, in particular to the automatic determination of port identities in a heterogenous telecommunications system.

BACKGROUND OF THE INVENTION

In 1876, inside a third floor walk-up garret apartment in the Scollay Square section of Boston Massachusetts, Alexander Graham Bell spoke the first sentence transmitted over telephone wires. Technical innovations have dramatically transformed the telecommunications industry over the past one hundred and twenty three years. For example, telecommunications switching systems have evolved considerably from "hand operated" systems in which one instrument was electrically connected (through a hierarchical switching network) to another through the intervention of a human operator who would physically plug one circuit into another. Such direct electrical connection of two or more channels between two points (at least one channel in each direction), a connection that provides a user with exclusive use of the channels to exchange information, is referred to as circuit switching, or line switching. Human operators have largely been replaced by systems which employ electronic switching systems (ESS), in which the instruments are automatically connected through the network by electronic systems.

Additionally, in many cases, the signalling system employs optical signalling instead of, or in addition to, electronic signalling. Nevertheless, such switching systems often still employ circuit switching, a technique which yields highly reliable service, particularly for such "real time" communications applications as voice, in which the momentary loss of a channel is annoying and repeated such losses are unacceptable. Switching systems may interconnect telephone instruments through circuit switching, employing time division multiplexing (TDM), for example. The switching system may carry digitized telecommunications signal over optical paths that are in conformity with synchronous optical network (SONET) standards. Such networks include network elements such as SONET network elements, SDH network elements, or wavelength division multiplexed network elements, for example. Circuit switching network elements include any network elements which conforms with SONET/SDH digital signal formats. The signal formats are described, for example, in a Technical Advisory entitled "Synchronous Optical Network (SONET) Transport Systems: Common Generic Criteria", TA-NWT-000253, Bell Communications Research, Issue Sep. 6, 1990, which is hereby incorporated by reference. For a variety of reasons it may be important to know which port in a given network element (NE) within such a system is connected to a particular port of another NE within the system.

Although SONET systems may incorporate a facility for such port identification and network elements within a circuit switching telecommunications system may employ this facility to identify ports, network elements within a packet switching system do not typically provide for port identification. That is, a technique known as packet switching may be employed for the transmission of data over telecommunications network. With packet switching data is transmitted in packets, and the communications channel is only occupied for the duration of a packet's transmission. After the transmission, the channel is available for use by other packets being transferred for other users. The packetized transmission may be transmitted using asynchronous transfer mode (ATM) techniques, for example. Asynchronous transfer mode (ATM) is a connection-oriented transmission technique that employs fixed-size blocks of data, called cells, each of which consists of a five octet long header and an information field that is forty-eight octets long. Packet switching network elements, such as ATM nodes or Internet Protocol (IP) routers, typically ignore the SONET signalling that might otherwise be employed to identify specific interconnected ports within a telecommunications network. Consequently, operator intervention may be required to accomplish such identification. Such a process would be time consuming, fraught with the potential for errors, and cost-prohibitive. Systems that employ both circuit switching and packet switching network elements and which employ SONET signalling may be referred to hereinafter as heterogeneous telecommunications systems. A heterogeneous telecommunications system that provides for automatic port identification would therefore be highly desirable.

SUMMARY

A heterogeneous telecommunications system in accordance with the principles of the present invention employs "out of band" signalling to automatically discover the identities of ports interconnected between packet switching and circuit switching network elements. Interconnected circuit switching and packet switching network elements employ a network management channel, such as a local area network (LAN) network management link, to automatically discover port binding information (that is, which port of an initiating network element is connected to which port of a receiving network element).

In accordance with the principles of the present invention, an NE may, under various circumstances, such as it's initialization, or re-booting, initiate a port interconnectivity discovery process by sending a recognition request message to a network element to which it is bound through a network link. The recognition request message is transmitted from the initiating network element to the receiving network element through an "out of band channel", such as a network management link, which may take the form of a LAN, for example. The initiating network element awaits an acknowledgement signal from the receiving network element and, once received, transmits a test message from a specific port to the receiving network element. The test message transmitted by the initiating network element may be transport level overhead message, such as a SONET/SDH "K2 byte" protection message, for example. After sending the, acknowledgement message to the initiating network element, the receiving network element begins polling its ports to detect which port receives the test message. Once the receiving network element detects which of its ports receives the test message, the receiving network element records the port binding information and stops its own ports. Additionally, the receiving network element transmits a detection message to the initiating network element, which includes the receiving network element's port identity, through the out of band channel. Upon receiving the detection message from the receiving network element, the initiating network element stops sending the test message through the SONET/SDH link, records the port binding information, and transmits a recognition acknowledgement message to the receiving network element through the out of band channel.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
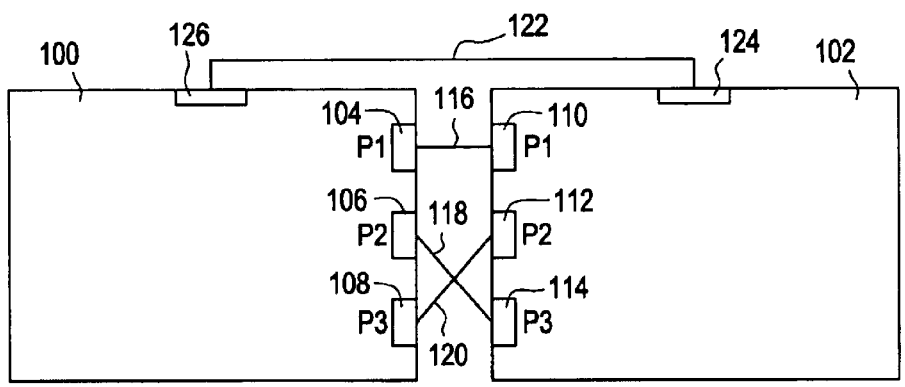
FIG. 1 is a conceptual block diagram of a two-network-element heterogeneous telecommunications system in accordance with the principles of the present invention.

As illustrated in the conceptual block diagram of FIG. 1, a heterogeneous telecommunications system in accordance with the principles of the present invention includes at least one circuit switching network element 100 and one packet switching network element 102. Each of the network elements is connected to other network elements through ports, such as port 104 (P1), port 106 (P2), and port 108 (P3) of the circuit switching network element 100 and port 110 (P1), port 112 (P2), and port 14 (P3) of the packet switching network element 102. In the illustrative conceptual block diagram of FIG. 1, port P1 104 of NE 100 is connected through a link 116 to port P1 110 of NE 102, port P2 106 of NE 102 is connected through a link 118 to port P3 114 of NE 102, and port P3 108 of NE 100 is connected through a link 120 to port P2 112 of NE 102. Each of the links 116, 118, and 120 employs a SONET/SDH transport level and in addition to the data they carry, overhead, control, information is sent through the links.

Although it may be possible to use the control information carried in these links to determine the port interconnectivity of the network elements 100 and 102, packet switching devices, such as the network element 102, would have to get involved in "byte processing" to take advantage of this overhead information. This additional byte processing burden would prove prohibitive, or, at the least, inconvenient for packet switching NEs. Nevertheless, this port interconnectivity information is required for some applications and manual discovery and recordation of this interconnectivity information also has significant drawbacks. In accordance with the principles of the present invention, and "out of band" communications channel, such as that formed by the link 122 and interfaces 124 and 126, respectively located within NEs 102 and 100. This out of band channel may take the form of a local area network (LAN) which connects a group of NEs and which provides a path for management and control of the NEs thus connected. In accordance with the principles of the present invention, the NEs support at least one network transport level overhead message, such as a SONET/SDH "K2 byte" protection message. In this illustrative embodiment, the NEs support STS-1 line overhead K1 and K2 byte protection switching, which is discussed in, Ming-Chwan Chow, Undersanding SONET/SDH Standards and Applications, Andan Publisher, New Jersey, 1995 pgs 2–25 through 2–28 and 7–39 through 7–40, which is hereby incorporated by reference. More particularly, the NEs support the standard, at the least insofar as the K1 K2 byte definitions (only definitions for bits 6, 7 and 8 are illustrated) as set forth in the table of FIG. 2.

Figures 2, 3:
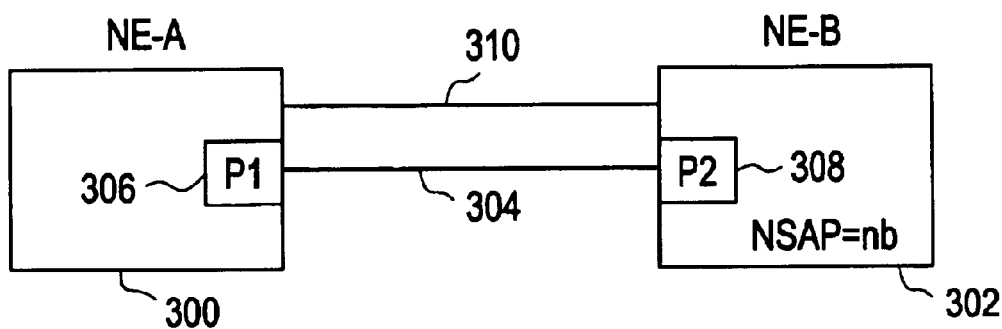
FIG. 2 is a table which illustrates SONET/SDH channel status bit definitions.
FIG. 3 is a conceptual block diagram of a two network element heterogenous telecommunications system linked by a SONET/SDH link

In accordance with the principles of the present invention, K1 and K2 bytes, which are employed by both circuit switching and packet switching network elements for protection switching, are employed as a recognition signal whereby port identities may be automatically discovered using an automatic interconnection recognition protocol (AIRP). As indicated in the table of FIG. 2 bit codes 101 and 100 are not previously assigned. Code 100 is used in accordance with the principles of the present invention as the AIRP SONET/SDH recognition signal. The new protocol (AIRP) may use either a LAN connection or serial link that employs TCP as a transport layer for communications sessions. Port interconnectivity may be discovered between two peers with a single AIRP session and, in order to establish and maintain the port interconnectivity information, an AIRP session should be run each time an NE is intialized or re-booted. As will be described in greater detail below, an NE may initiate the port interconnectivity discovery process by, sending a port identification initiation message to a NE to which it is linked In accordance with the principles of the present invention, an NE may, under various circumstances, such as it's initialization, or re-booting initiate a port interconnectivity discovery process by sending a recognition request message to a network element to which it is bound through a network link. The recognition request message is transmitted from the initiating network element, such as network element 100 to a receiving network element, such as network element 102 through the out of band link 122. The initiating network element 100 awaits an acknowledgement signal from the receiving network element 102 and, once received, transmits a test message from a specific port, such as port P2 106 to the receiving network element 102. The test message transmitted by the initiating network element may be a SONET/SDH "K2 byte" protection message. After sending an acknowledgement message to the initiating network element through the link 122, the receiving network element 102 begins polling its ports to detect which port receives the test message. Once the receiving network element detects which of its ports receives the test message (port P3 114 in this illustrative example), the receiving network element records the port binding information and stops polling its own ports. Additionally, the receiving network element 102 transmits a detection message to the initiating network element 100. This detection message includes the receiving network element's port identity and is transmitted through the out of band channel, or link, 122. Upon receiving the detection message from the receiving network element 102, the initiating network element 100 stops sending the test message through the SONET/SDH link 118, records the port binding information, and transmits a recognition acknowledgement message to the receiving network element 102 through the out of band channel 122.

The conceptual block diagram of FIG. 3 depicts an ATM network element 300 and a SONET/SDH network element 302 connected through a link 304. In this illustrative example network element 300 port p1 306 has, the following attributes:

Switch Name=A
Slot Number=S1
Port ID=P1

Where the slot number identifies the physical location of the network element in an equipment rack and the port ID refers to the identity of the port which is connected through the link 304. The network element 302 port 2 308 has has the following attributes:

TID=B,
Port ID=p2
NADDR=nb.

Where TID indicates the TL1 identity (that is the switch name), the port ID refers to the identity of the port connected through the link 304, and NADDR refers to the network element's node address. Although one of the network elements is referred to herein as a SONET/SDH network element, and one is referred to as an ATM network element, it is assumed that both network elements employ SONET/SDH at the transport level and that the circuit switching network element simply does the sort of SONET/SDH byte processing that might prove onerous to a packet switching network element, such as an ATM network element. The term "SONET/SDH" network element is used interchangeably with the term "circuit switched network element", and the term "ATM network element" is used interchangeably with the term "packet switched network element", herein. A network management link, or control channel, which may take the physical form of a LAN, is represented by the line 310.

Figure 4:
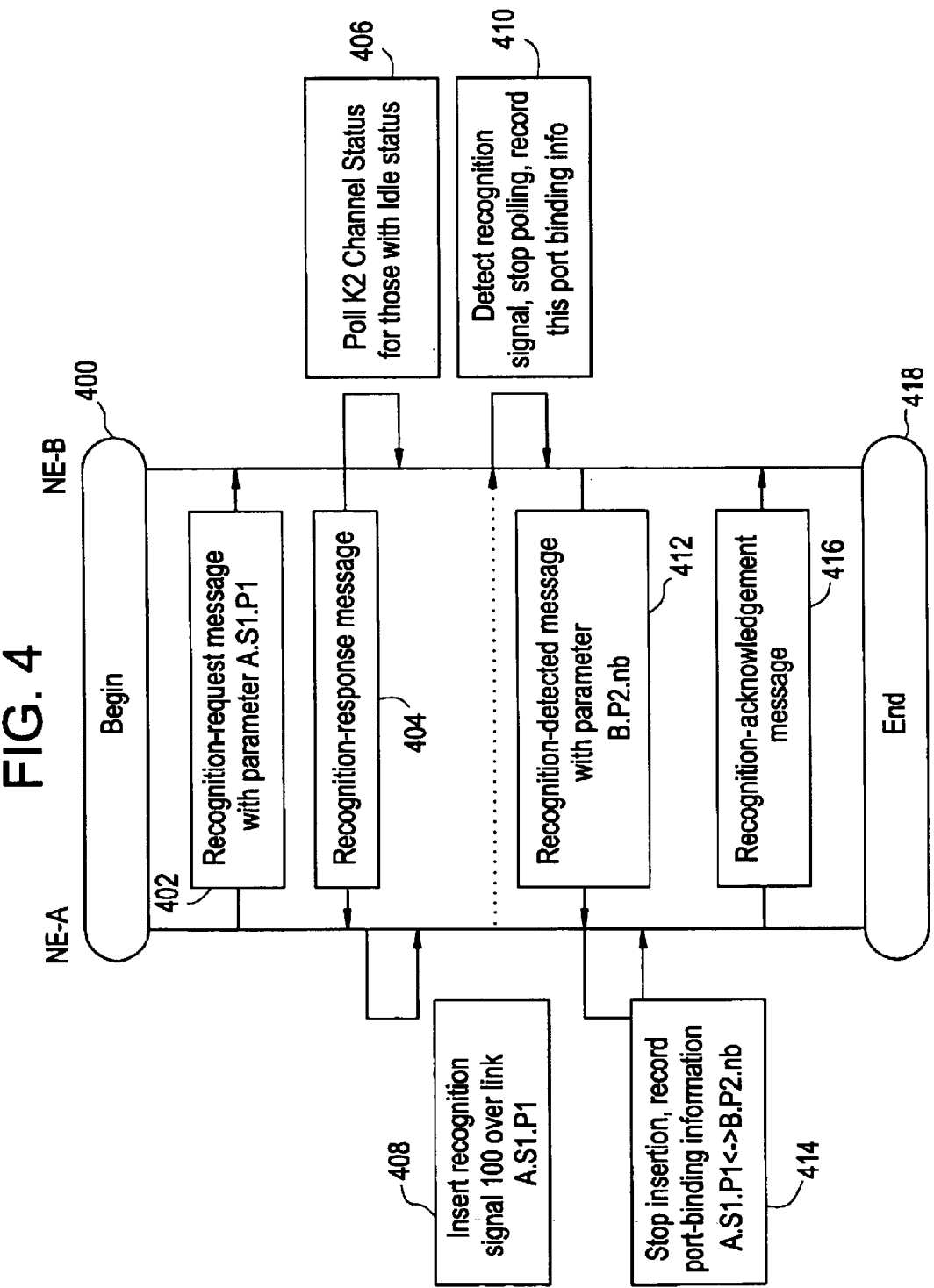
FIG. 4 is a sequence diagram which illustrates a process of automatic discovery of port binding information, such as might be employed with the system of FIG. 3.

The scenario diagram of FIG. 4 illustrates a port binding discovery message exchange sequence between network elements NE-A 300 and NE-B 302 of FIG. 3. In this illustrative example, when the link 304 is first installed or re-established, or a controller node within the telecommunications network(not shown) re-initializes, NE-A 300 is initialized with a physical link ID A.S1.P1, where:

A is the switch name of NE-A
S1 is the corresponding slot No.
P1 is the corresponding port No.

In accordance with the principles of the invention, the port binding information related to the link 304 may be discovered by the following process which begins in step 400 and proceeds to step 402 in which NE-A sends an AIRP_recognition_request message to NE-B through the control channel 310. As will be described in greater detail below, the AIRP_recognition_request message includes the physical link ID information, A.S1.P1, of NE-A. After receiving the AIRP_recognition_request message, NE-B records the physical link ID of NE-A, A.S1.P1, received and, in step 404, returns an AIRP_recognition_response message to NE-A through the control channel 310. Additionally, in step 406 NE-B starts to poll those of its SONET line interfaces that indicate they are currently idle, that is, those SONET line interfaces whose current line byte K2's Channel Status (bits 6, 7, 8)=000 (Idle). When NE-A receives the AIRP_recognition_response message returned from NE-B, in step 408, NE-A begins inserting a recognition, or test, signal, which will be described in greater detail below, into the SONET link 304. When NE-B detects in step 410 one link interface's Channel Status (K2's bits 6,7,8) transitioned from 000 (Idle) to 100 (testing signal), that of B.P2.nb in this illustrative example, NE-B has thereby determined the port binding information for this link. That is, since NE-B "knows" from the AIRP_recognition_request message that NE-A sent the test message from slot S1, port S1 and, by virtue of its transition from idle to test status, the test message was received at the NE-B port identified as B.P2.nb, NE-B has discovered that the port binding information for SONET/SDH link 304 is: A.S1.P1 connects to B.P2.nb. Additionally, in step 410 NE-B stops polling and records the port binding information. In step 412 NE-B returns a AIRP_recognition_detected message (including B.P2.nb) to NE-A through the control channel 310. In step 414 after NE-A receives the AIRP_recognition_detected message, it stops inserting the recognition signal (set K2's bits 6,7,8 back to 000: Idle) in the SONET/SDH link 304 and stores the port binding information: A.S1.P1<->B.P2.nb, as a port-binding entry in a port binding database or table. The process proceeds to step 416 where NE-A transmits an AIRP_recognition_acknowledgement message through the control channel 310 to NE-B, indicating the end of the round of recognition. The process proceeds to end in step 418.

The format and content of protocol data units (PDU) employed in automatic port binding discovery, that is, the new automatic interconnection recognition protocol (AIRP) in accordance with the principles of the present invention are described immediately below.

Each AIRP PDU is an AIRP header followed by AIRP messages.

The AIRP header is:

| Version | PDU length |
|---|---|

Version:
  Two octet unsigned integer containing the version number of the protocol. This version of the specification specifies AIRP protocol version 1.

PDU Length:
  Two octet integer specifying the total length of this PDU in octets, excluding the Version and PDU Length fields.

AIRP uses a Type-Length-Value (TLV) encoding scheme to encode much of the information carried in AIRP messages. An AIRP TLV is encoded as 1 octet Type Field, followed by a 2 octet Length Field, followed by a variable length Value field.

| Type | Length | Value |
|---|---|---|

Type
  Encodes how the Value field is to be interpreted.
Length
  Specifies the length of the Value field in octets.
Value
  Octet string of Length octets that encodes information to be interpreted as specified by the Type field.

In total, there are nine AIRP message types defined:

AIRP_Init TLV:

| Type = 1 | Length = 0 | Empty |
|---|---|---|

AIRP_Ack TLV:

| Type = 2 | Length = 0 | Empty |
|---|---|---|

AIRP_Nak TLV:

| Type = 3 | Length = 0 | Empty |

AIRP_Close TLV:

| Type = 4 | Length = 0 | Empty |

AIRP_recognition_request TLV:

| Type = 5 | Length = $\sum_i$ length(value_field) |

Value field definition:

| Source address |
| Message sequence No. |
| Port ID |

AIRP_recognition_response TLV:

| Type = 6 | Length = $\sum_i$ length(value_field) |

Value field definition:

| Source address |
| Recognition_request message sequence No. |

AIRP_recognition detected TLV:

| Type = 7 | Length = $\sum_i$ length(value_field) |

Value field definition:

| Source address |
| Recognition_request message sequence No. |
| Corresponding port ID |

AIRP_recognition_acknowledgement TLV:

| Type = 8 | Length = $\sum_i$ length(value_field) |

Value field definition:

| Source address |
| Recognition_request detected sequence No. |

AIRP_recognition_abnormal TLV:

| Type = 9 | Length = $\sum_i$ length(value_field) |

Value field definition:

| Source address |
| Recognition_request message sequence No. |

An AIRP stack initialization sequence will be discussed in relation to the state diagram of FIG. 5. In this illustrative discussion, it is assumed that hello messages have been exchanged between two peer network elements. This exchange of hello messages serves to provide each network element with the address of the other. If we assume one NE has address Al, and the other NE has address A2, with address A1>A2, the NE with Al address is configured as an active side. The NE having a lower address, A2, configures itself as a passive side. The significance of "active side" and "passive side" appellations will be clear from the following discussion.

State 1 500 is referred to as a "non-existing" state and, once a TCP session is established with another network element, the NE transitions to state 2 502. State 2 is referred to as the initialized state. In state 2 502, if an NE is playing the active role, it initiates an AIRP establishment session by sending AIRP_Init message to the other NE through a non-SONET/SDH channel, such as the control channel 310. The active NE would then transition to state 3 504.

On the other hand, if the NE is a passive NE, in state 2 502 the NE waits for the active NE to initiate an AIRP port binding establishment session. Once the passive NE receives an AIRP_Init message, it returns an AIRP_Init message to the active NE and transitions to State 4 506, the open-passive state. If, while in state 4 506, the passive NE receives any message other than an AIRP_Ack message, or if it experiences a timeout, it will send an AIRP_Nak message to the active NE, through the control channel 310, and will return from state 4 506 to state 1 500. Similarly, in state 3 504, the open-active state, if the active NE receives an initialization message from the passive NE, the active NE returns an AIRP_Ack message to the passive NE and transitions to state 4 506. If the active NE experiences a timeout, or if it receives any message other than an AIRP_Init message, the active NE send AIRP_Nak message to the passive NE through the control channel 310 and transitions to state 1 500.

If an NE in state 4 506 receives AIRP_Ack message from the other NE, the NE transitions to state 5 508. The reception of any message other than an AIRP_Ack message or a timeout will cause the NE to send AIRP_Nak message and transition to state 1 500. In state 5 508, the operational state, all operational messages, other than an AIRP_Close message will maintain the NE in the operational state 508 Should the NE receive an AIRP_Close message or experience a timeout, the NE will send an AIRP_Ack message to the other NE and transition to state 1 500.

Figure 5:
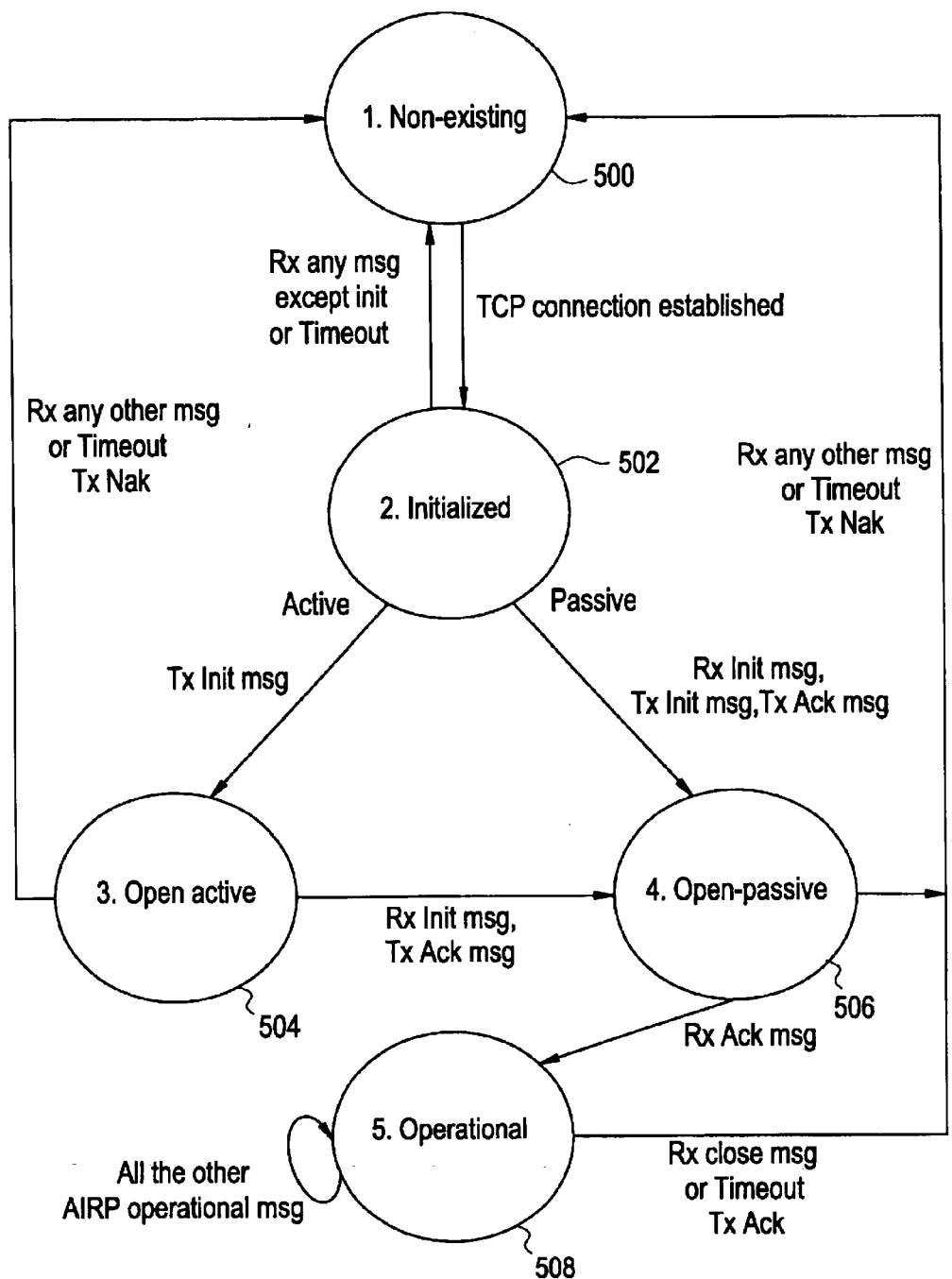
FIG. 5 is a state diagram which illustrates the initialization of NEs in accordance with the principles of the present invention.

Following the initialization process described in the discussion related to FIG. 5, the two NEs using the. AIRP to exchange inter-connection recognition information will be referred to as "AIRP Peers". AIRP peers may employ AIRP operational messages to discover and communicate port binding information. There are five types of AIRP operational messages:

1). AIRP__recognition__request message, used to request the corresponding side to participate in inter-connection recognition process.
2). AIRP__recognition__response message, used to respond to the requesting side.
3). AIRP__recognition__detected message, used to inform the requesting side the corresponding inter-connection ID information.
4). AIRP__recognition__acknowledgement message, used by requesting side as an acknowledgement message back to the requested side.
5). AIRP__recognition__abnormal message, used by requested side to indicate certain abnormal scenario.

Figure 6:
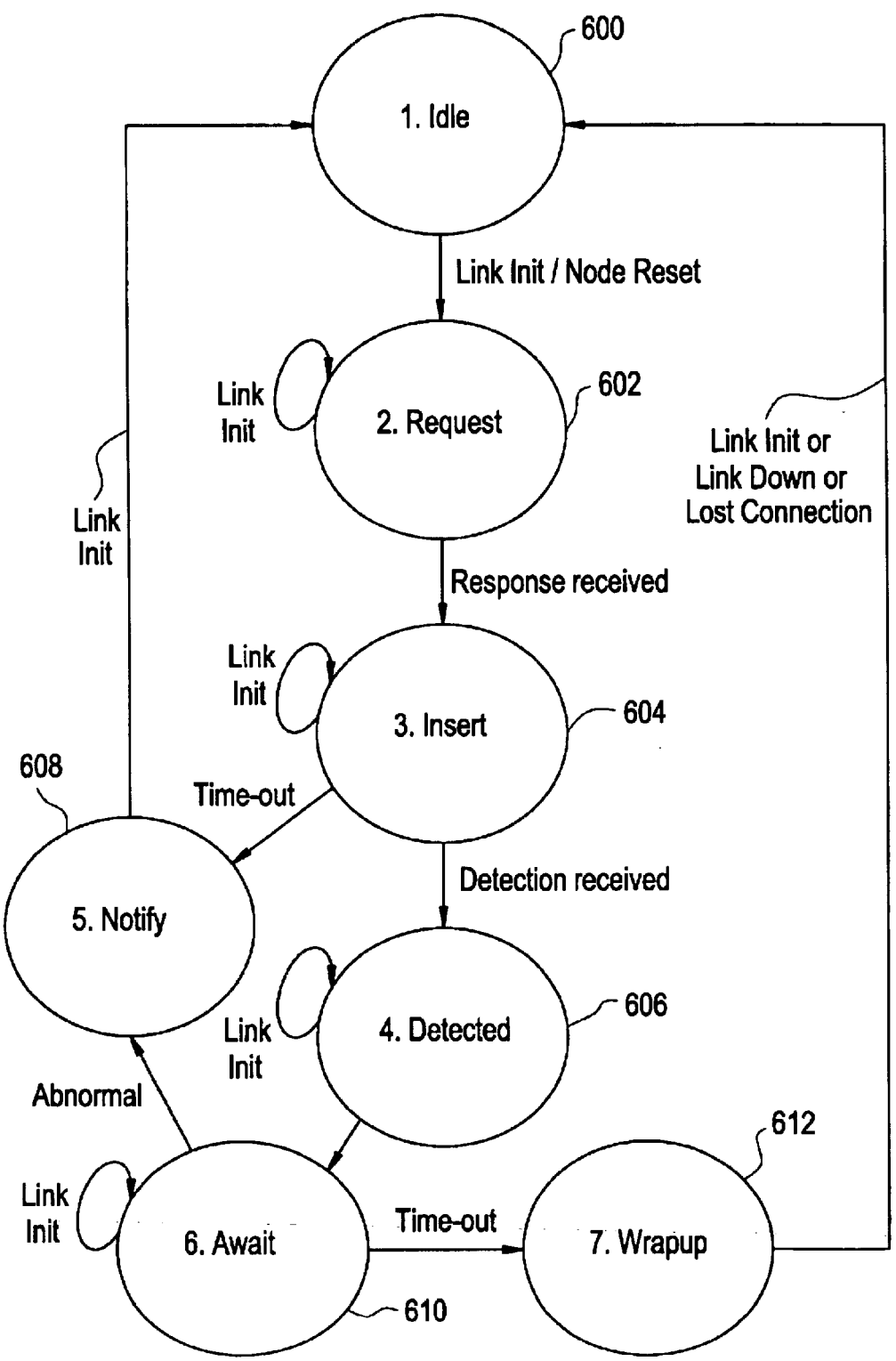
FIG. 6 is a state diagram which illustrates various states that an active NE might assume in the automatic discovery, of port binding information.

The AIRP operation of an active network element, a packet switching, ATM network element in this example will be discussed in relation to the state diagram of FIG. 6. The AIRP finite state machine (FSM) is (re-) started when a node is started or re-set. The process begins in state 1 600, the idle state, in which it is assumed that system configuration has been completed. For example, the ATM NE of FIG. 2, NE-A, would be configured to indicate which links are connected with which neighboring NEs. Note that, although the NE may be configured at this point to know which neighboring NE is connected through which link, the port interconnectivity is not known at this point. Link initialization could happen at system starting/re-set time and run time, and will trigger an AIRP state transition. To ensure that only one recognition signal will be sent to a receiving side at one times all the incoming link initialization requests may be placed in a first in first out (FIFO) queue, with only a request at the top of the queue being capable of triggering a state transition. It is also assumed that the default channel status (bits 6, 7, 8 of K2 byte) of the initialized link is 000 (Idle). After processing any link initialization overhead, the ATM NE proceeds to state 2 602, the request state.

In state 2 602, the ATM NE sends an AIRP__recognition__request message to a connected NE. Included within the AIRP__recognition__request message is the ATM link number of the link of the request currently at the top of the queue. After sending the AIRP__recognition__request message this ATM NE awaits a response message from the NE to which it is connected. It should be noted that whether the other NE is a packet switched or a circuit switched NE, it is a passive NE, according to the definition of passive NE set forth herein. If another LinkInit request arrives while the NE is in state 2, the request will be placed at the end of the requesting queue. Once the ATM NE receives an AIRP__recognition__response message from the NE to which it is connected through the link in question, the other side, that is, the active NE, which is an ATM NE in this example, will transition into the "insert state", state 3 604.

In state 3 604 the ATM NE triggers its SONET interface driver to insert the test, or recognition signal as described above into the link corresponding to the ports which are being discovered. Additionally, the ATM NE awaits the reception of an AIRP__recognition__detected message from the NE connected to the opposite end of the link and initiates a waiting-timer In this state, if another LinkInit request arrives, it is placed at the end of LinkInit requesting queue. Once the ATM NE receives an AIRP__recognition__detected message from the NE connected to the other end of the link in question, the ATM NE transitions into state 4 606 and the waiting-timer is stopped. However, if the waiting-timer expires before the NE receives an AIRP__recognition__detected message from the NE connected to the other end of the link, the ATM NE transitions into State 5 608.

Once in the detected state 4 606 the ATM NE records detected information, such as the A.S1.P1<->B.P2.nb binding information discussed in relation to FIG. 4, for example. This information may be placed in a database, or table, such as a port binding table. After recording this binding information, the ATM NE triggers its SONET interface driver to insert idle signal (000) into the link in question. Additionally, the ATM NE sends an AIRP__recognition__acknowledgement message to the NE connected to the other end of the link and initiates a waiting-timer. The ATM NE then transitions into state 6 60, the awaiting state. Any other LinkInit request that arrives during state 4 is placed at the end of the requesting queue.

Returning for a moment to state 5 608, the ATM NE indicates to the attached NE that an anomaly has occurred and removes the link-request from the LinkInit request queue. If the queue is not empty the ATM NE returns to state. If the queue is empty, the ATM NE idles in state 5 608 until another LinkInit arrives, whereupon the ATM NE transitions to state 1 600.

In the await state 6 610, the ATM NE stops the waiting timer and transitions to state 5 608 if it receives an AIRP__recognition__abnormal message from the NE connected to the other end of the link. Otherwise, the waiting timer times-out and the ATM NE transitions to state 7 612. If another LinkInit request arrives while the ATM NE resides in state 6, the ATM NE places the request at the end of the requesting queue.

In the wrap-up state 7 612 the ATM NE removes the link request (also referred to as a "LinkInit request" and "AIRP__recognition__request") from the LinkInit request queue and, if the queue is not empty, the ATM NE transitions to State 1 600. If the queue is empty, the ATM NE idles in state 7 612 until another LinkInit arrives, whereupon the ATM NE transitions to state 1 600.

Figure 7:
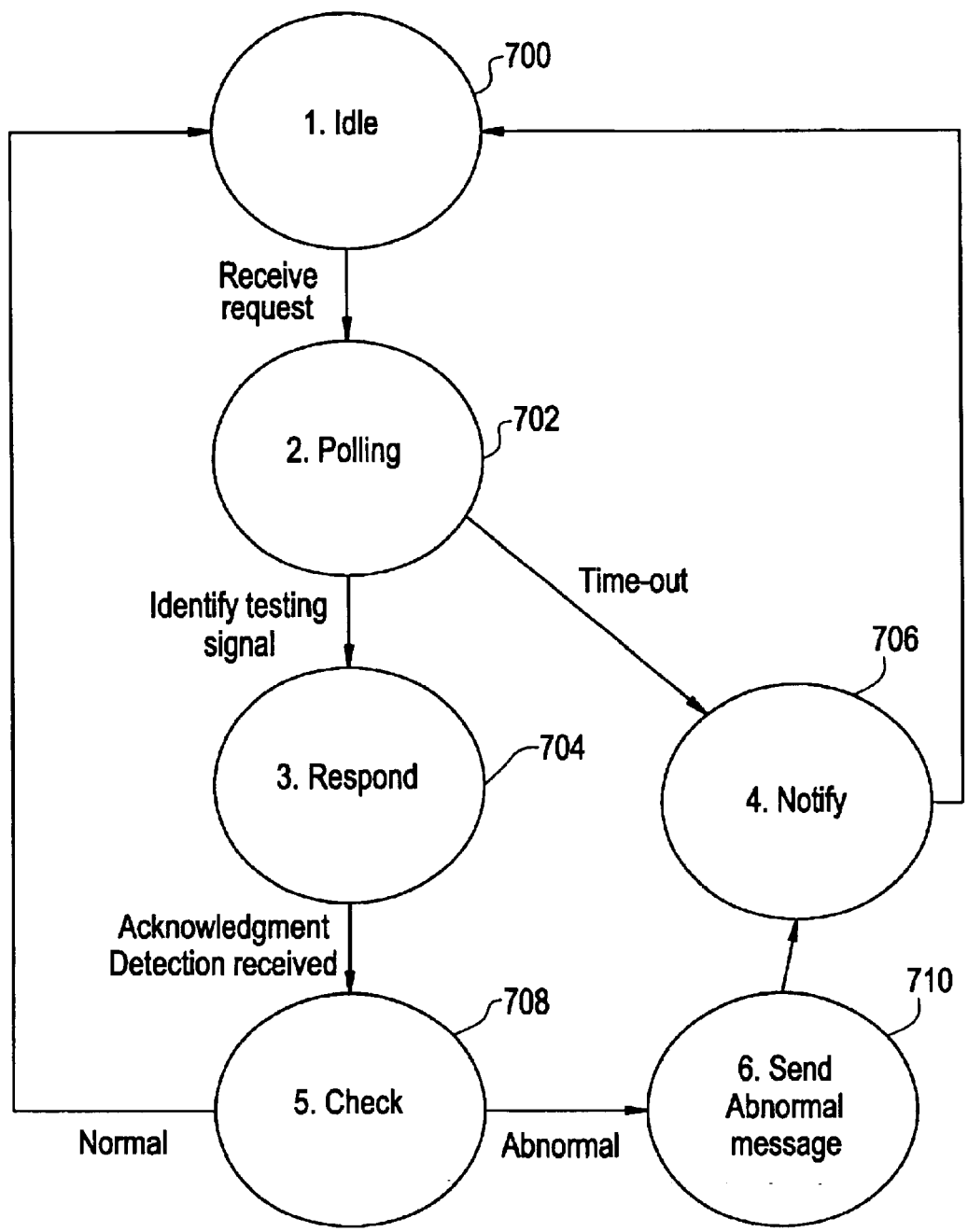
FIG. 7 is a state diagram which illustrates various state that a passive NE might assume in the automatic discovery of port binding information.

The AIRP operation of a passive network element, a circuit switching network element, referred to as an SONET NE in this example, will be discussed in relation to the finite state machine (FSM) diagram of FIG. 7 The AIRP FSM is (re-) started when a node is started or re-set. The process begins in state 1 700, the idle state, in which it is assumed that system configuration has been completed That is, for example, the NE B of FIG. 3 should be configured to know which links are connected to which neighboring NEs. It is also assumed that the default channel status (bits 6, 7, 8 of K2 byte) of initialized link is 000 (Idle). After receiving an AIRP__recognition__request, the AIRP FSM transitions to State 2 702.

In State 2 702, the polling state, the SONET NE starts polling all its line interfaces that exhibit an idle link status (bit 6,7,8 of byte K2 is 000) and initiates a detection-timer. Additionally, the SONET NE transmits a recognition-response message to the NE connected to the opposite end of the link undergoing the port binding operation. If the SONET NE identifies a port recognition, or test signal the SONET NE stops the detection timer and transitions to state 3 704. If, on the other hand, the detection timer times out before a test signal is received at any of the polled ports, the SONET NE transitions to state 4 706.

In State 3 704, the response state, the SONET NE sends an AIRP__recognition__detected message to the NE attached to the other end of the link for which port binding information is being discovered. The AIRP__recognition__detected message includes the SONET link number of the link. After sending the The AIRP__recognition__detected message, the SONET NE awaits an AIRP__recognition__acknowledgement message from the NE connected to the opposite end of the link. When the AIRP__recognition__acknowledgement message is received, the SONET NE transitions to state 5 708.

In state 4 706, the notify state, the SONET NE sends a message indicating that an anomaly has occurred within the link, then transitions to state 1 700. In state 5 708, the check state, the SONET NE checks the current link status of the just identified link. If the link returns to idle: 000, the SONET NE transitions to state 1 700. If the link status does not return to idle, the SONET NE transitions to state 6 710 and, in state 6 710, the SONET NE transmits an AIRP__recognition__abnormal message to the NE connected to the opposite end of the link, after which the SONET NE transitions to state 4 706 and from there as previously described.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A network element comprising:
   a plurality of SONET/SDH ports, each port operable to connect to another network element, and configured to support at least one network transport level overhead message; and
   an out of band channel for communication with the other network element, the out of band channel configured to transmit a request for port identification and to receive a request for port identification,
   the network element operable to respond to the reception of a port detection signal by polling a plurality of ports to detect which ports receive the port detection sign,
   each port further configured to transmit a port detection signal which includes the identity of the port, in cooperation with a request for port identification transmitted through the out of band channel.

2. The network element of claim 1 wherein the port detection signal is a SONET/SDH protection switching message.

3. The network element of claim 1 wherein the network element is responsive to the detection of the port detection signal by storing port binding information.

4. The network element of claim 1 wherein the network element is responsive to the detection of the port detection signal by transmitting the port binding information to a network element which transmitted the request for port identification.

5. The network element of claim 1 wherein the network element is configured to poll only those ports having an idle status in order to detect the reception of a port detection signal.

6. A heterogenous telecommunications system comprising:
   a circuit switching network element; and
   a packet switching network element, each of the network elements including:
   a plurality of SONET/SDH ports;
   each port operable to connect to one of the network elements and configured to support, at least one network transport level overhead message; and
   an out of band channel for communication with one or more network elements, the out of band channel configured to transmit a request for port identification and to receive a request for port identification,
   each network element operable to respond to the reception of a port detection signal by polling a plurality of ports to detect which ports receive the port detection signal, each port further configured to transmit a port detection signal which includes the identity of the port in cooperation with a request for port identification transmitted through the out of band channel.

7. The system of claim 6 wherein the port detection signal is a SONET/SDH protection switching message.

8. The system of claim 6 wherein each network element responds to the detection of a port detection signal by storing port binding information.

9. The system of claim 6 wherein each network element responds to the detection of a port detection signal by transmitting port binding information to a network element which transmitted the request for port identification.

10. The system of claim 6 wherein each network element is configured to poll only those ports having an idle status in order to detect the reception of a port detection signal.

11. A method allowing a first type of network element to automatically determine port binding information comprising the steps of:
    receiving a port detection request;
    monitoring ports to detect the reception of a port detection signal;
    transmitting a request for port identification information through an out of band channel to a second type of network element; and
    transmitting a port detection signal, the port detection signal being a SONET/SDH protection switching message which includes the port's identity to the second type of network element.

12. The method of claim 11 further comprising the step of:
    polling all idle ports of the first type of network element to detect a status change at the port which receives the port detection message.

13. The method of claim 11 further comprising the step of:
    storing port binding information in response to the detection of the port detection signal.

14. The method of claim 11 further comprising the step of:
    transmitting port binding information to the second type of network element in response to the detection of the port detection signal.

15. A method for automatically detecting port binding information in a heterogenous telecommunications system comprising the steps of:
    receiving a port detection request at a first network element;
    monitoring ports to detect the reception of a port detection signal;
    transmitting, from the first network element, a request for port identification information through an out of band channel to a second network element; and
    transmitting a port detection signal, the port detection signal being a SONET/SDH protection switching message which includes a port identity to the second network element through the link.

16. The method of claim 15 further comprising the step of:
    polling all idle ports of the first network element to detect a status change at the port which receives the port detection message.

17. The method of claim 16 further comprising the step of: storing port binding information.

18. The method of claim 17 further comprising the step of: transmitting the port binding information to the second network element.

19. A first type of network element comprising:
   a port for connection to a second type of network element, the port configured to support at least one network transport level overhead message; and
   an out of band channel for communication with the second type of network element, the out of band channel configured to transmit a request for port identification and to receive a request for port identification, the port further configured to transmit a port detection signal in cooperation with the request for port identification transmitted through the out of band channel.

20. A heterogenous telecommunications system comprising:
   a circuit switching network element; and
   a packet switching network element, each of the network elements including:
      a port for connection to a network element, the port configured to support at least one network transport level overhead message; and
      an out of band channel for communication with one or more network elements, the out of band channel configured to transmit a request for port identification and to receive a request for port identification, the port further configured to transmit a port detection signal in cooperation with the request for port identification transmitted through the out of band channel.

21. A method for network element to automatically determine port binding information comprising the steps of:
   transmitting a request for port identification information from a first type of network element through an out of band channel to a second type of network element; and
   transmitting a port detection signal, the port detection signal being a network transport level overhead message, to the second type of network element.

22. A method for automatically detecting port binding information in a heterogenous telecommunications system comprising the steps of:
   transmitting a request for port identification information from a first type of network element through an out of band channel to a second type of network element; and
   transmitting a port detection signal, the port detection signal being a network transport level overhead message, to the second type of network element.

* * * * *